United States Patent [19]

Bartley et al.

[11] 4,137,491
[45] Jan. 30, 1979

[54] STEPPER MOTOR WITH ANALOG POSITIONING

[75] Inventors: George S. Bartley, Harleysville; Stanley N. Brunner, Downington, both of Pa.

[73] Assignee: Exxon Research & Engineering Co., Florham Park, N.J.

[21] Appl. No.: 833,266

[22] Filed: Sep. 14, 1977

[51] Int. Cl.² ............................................. G05B 19/40
[52] U.S. Cl. .................................................... 318/685
[58] Field of Search ................ 318/685, 696, 138, 254

[56] References Cited

U.S. PATENT DOCUMENTS

| 3,997,829 | 12/1976 | Suzaki et al. | 318/685 |
| 4,024,446 | 5/1977 | Burnett | 318/685 |

Primary Examiner—Herman J. Hohauser
Attorney, Agent, or Firm—Norman L. Norris

[57] ABSTRACT

Linear and rotary stepper motors are provided with predetermined stop positions which differ from the magnetically inherent stepped positions of the stepper motors. The predetermined stop positions result from sensing the distance the rotor or slider is from a predetermined stop position and generating a signal including a position component representing the distance to the stop position and a velocity component representing the velocity at which the stop position is being approached. The signal is in turn utilized to generate a current reference signal for the motor which is compared with the current of the motor so as to stop the motor at the predetermined stop position.

13 Claims, 8 Drawing Figures

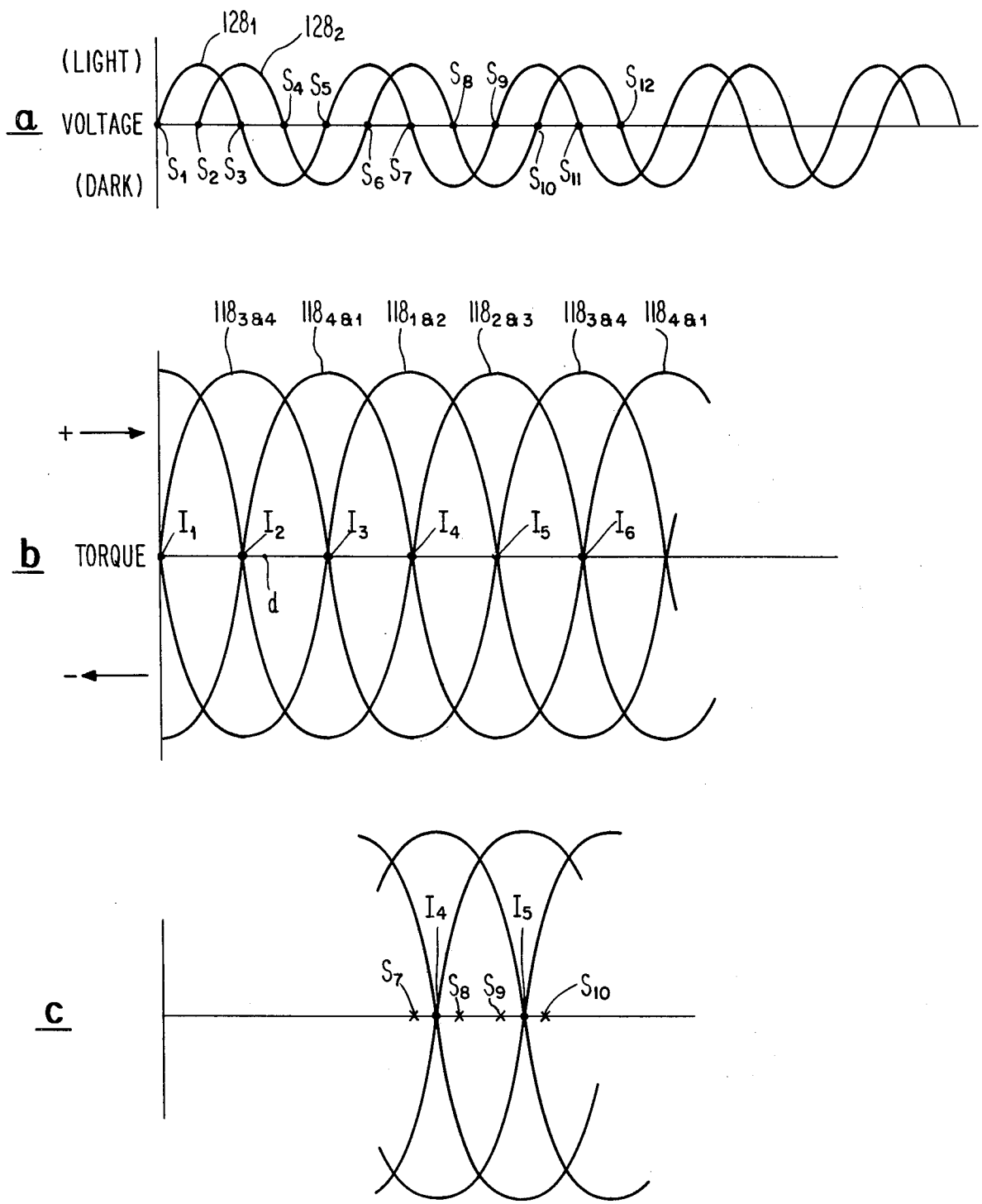

STEPPER MOTOR WITH ANALOG POSITIONING

BACKGROUND OF THE INVENTION

This invention relates to stepper motors of the rotary or linear type.

A stepper motor is an electromagnetic incremental actuator. A stepper motor of the variable reluctance or permanent magnet type includes a magnetic stator structure and a magnetic moving structure which comprises a rotor in the rotary motor case and a slider in the linear motor case. Either the moving structure or the stator structure has windings associated with various pole positions which are sequentially and selectively energized to produce incremental motion of the moving structure.

The stationary positions of linear and rotary stepper motors after each step, hereinafter referred to as the "step positions," are inherent in the magnet structure. In other words, the moving structure will move to a predetermined, stable stepped position is response to the energization of one or more windings.

In many applications, this incremental motion as provided by stepper motors is particularly desirable. One such application is found in printers of the type disclosed in copending application Ser. No. 809,646 filed June 24, 1977 wherein a linear stepper motor is utilized to advance a movable print point in a serial impact printer. The magnetically inherent step positions of a rotary stepper motor may be utilized to position a daisy character element in a serial impact printer as disclosed in copending application Ser. No. 809,923 filed June 24, 1977.

However, the magnetically inherent step positions of a linear or rotary stepper motor may be insufficient or inadequate in many applications including serial impact printers. For example, the magnetically inherent step positions may not provide a sufficient number of steps in a printer where very small steps are required as necessitated by certain print characters or certain spacing between print characters. In addition, the magnetically inherent step positions may be improperly located.

In this connection, it will be understood that a very high degree of precision is required of a printer linear stepper motor associated with a carriage as well as the rotary stepper motor associated with the print element. However, such precision may be difficult to achieve in the magnetic structure although the discrete steps of the stepper motor still provide distinct positioning control advantages in approaching the step position. In other words, the stepper motor affords control advantages in coarse positioning but may be inadequate for fine positioning.

Heretofore, feedback or closed-loop control of stepper motors has been utilized to control the selective energization of the motor winding. See *Theory and Applications of Step Motors*, Kuo, West Publishing Company 1974, pp. 252–272 and 279. However, the closed loop or feedback control has not been utilized to supplement or modify the inherent step positions but merely to control the motor in reaching those inherent step positions.

In U.S. Pat. No. 3,906,326, a DC motor is stopped at predetermined positions using optical feedback to position the motor However, the motor is not of the stepper type and there is therefore no effort to supplement or change the inherent step positions of such a motor since the DC motor disclosed has no such step positions.

SUMMARY OF THE INVENTION

It is an object of this invention to provide stepper motors with one or more stop positions which may differ from the magnetically inherent step positions.

It is a further object of this invention to provide a stepper motor with accurate stop positions independent of the accuracy in the magnetic structure of the stepper motor.

It is also an object of this invention to have the movable magnetic structure of the stepper motor stop quickly without oscillation.

It is also an object of this invention to provide a motor which is of relatively low cost due to simplicity of design and the elimination of brushes.

It is also an object of this invention to provide a motor which is reliable due to the simplicity of design and the elimination of brushes.

It is a further object of this invention to achieve stable positions with no steady-state power dissipation unlike normal variable reluctance motors which may require detent current to effect stable positions.

In accordance with these and other objects, a means and method are provided for operating a stepper motor comprising a movable magnetic structure, a stationary magnetic structure and a plurality of windings associated with one of the structures at a plurality of pole positions where the movable magnetic structure is inherently capable of moving between discrete magnetically determined step positions.

In accordance with this invention, the location of the movable magnetic structure is sensed and the distance between the sensed location and a predetermined stop position which may differ from the magnetically inherent step position is determined. The windings of the stepper motor are then energized so as to reduce this distance with the movable magnetic structure stopping substantially at the predetermined stop position.

In a particularly preferred embodiment of the invention, sensor means which may optionally sense the location of the movable magnetic structure relative to the predetermined position is coupled to position indicating means which generate a position signal representing the distance between the location of the movable magnetic structure and the predetermined position. A motor reference signal is then generated by a reference means coupled to the position indicating means. Comparison means coupled to the reference means compares the motor reference signal to a signal representing the state of the motor and motor control means coupled to the comparison means selectively energizes the windings of the motor in response to the comparison so as to reduce the distance between the location of the movable structure and the predetermined position.

In the preferred embodiment of the invention, the signal representing the state of the motor represents current flow through the energized windings. The reference signal represents the required current flow to reduce the distance towards zero. The motor control means then adjusts the current flow through the motor so as to reduce the distance. The adjustment of the motor control means is accomplished by periodically interrupting the current flow through the energized windings so as to vary the average current therethrough.

In accordance with one very important aspect of the invention, the error signal generated by the error means represents the distance as well as the velocity of the movable magnetic structure in approaching the predetermined position. More particularly, the error signal includes a position component less a velocity component.

In accordance with this invention, the sensor means may sense any of a plurality of locations of the moving magnetic structure relative to a predetermined position. In the alternative, the sensor means may sense a single location relative to a plurality of stop positions. Moreover, a plurality of sensor means may be utilized with each of the sensor means sensing the locations(s) of the movable magnetic structure relative to a different predetermined stop position(s).

BRIEF DESCRIPTION OF THE DRAWINGS

FIG. 7 is a diagram of waveforms utilized to explain the embodiment of FIG. 6.

DETAILED DESCRIPTION OF A PREFERRED EMBODIMENT

Figure 1:
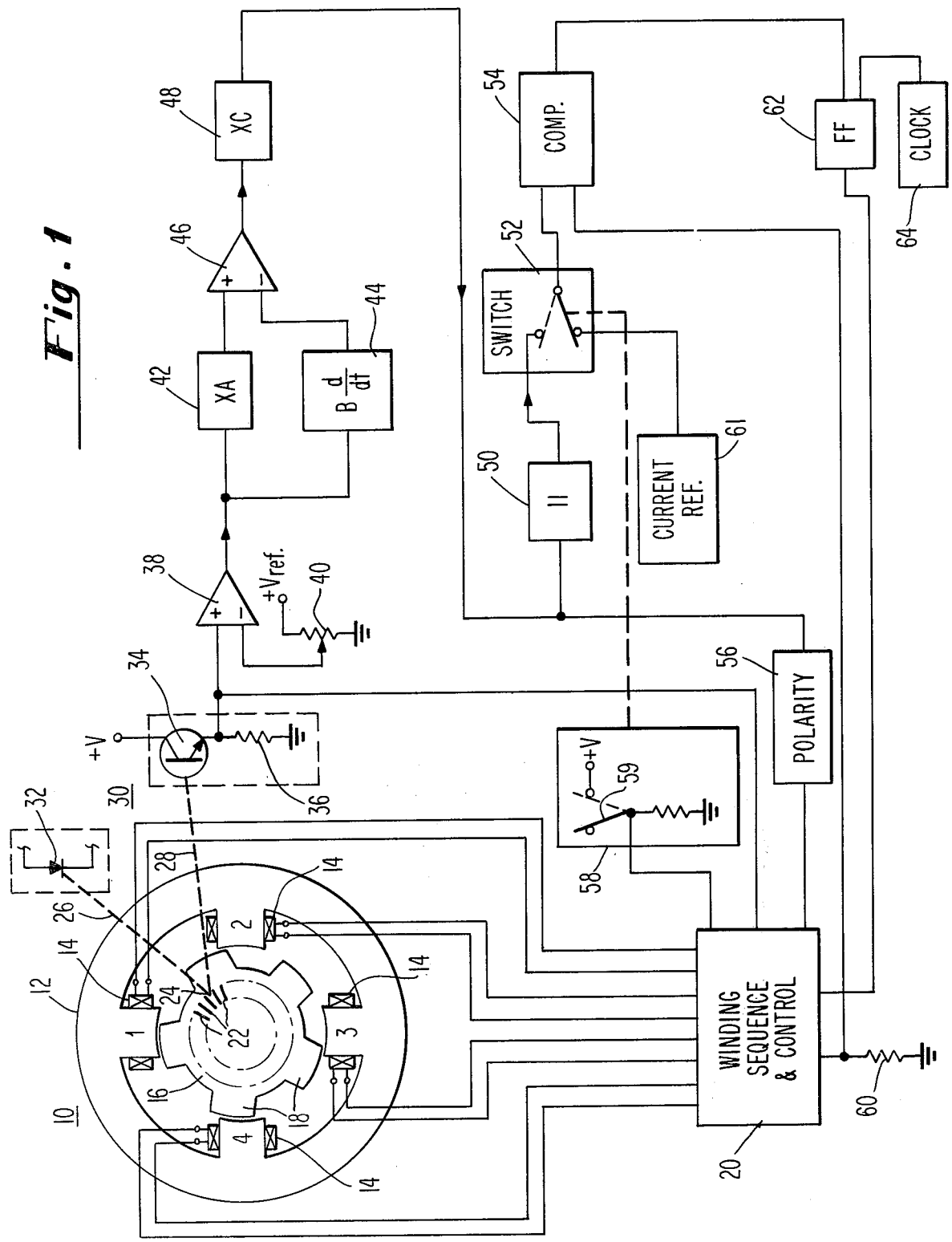
FIG. 1 is a partially schematic, block diagram illustrating one embodiment of the invention.

Referring to the embodiment of the invention shown in FIG. 1, a rotary stepper motor 10 comprising a stator structure 12 including a plurality of pole positions 1–4 having windings 14 associated therewith is magnetically coupled to a rotor 16 having a plurality of pole faces 18. As the windings 14 are selectively energized at the various pole positions 1–4 in different phases, the pole faces 18 and the rotor 16 will be advanced in accordance with well-known stepper motor techniques. For example, energization of the winding 14 at the pole position 1 of the stator 12 will produce an incremental rotation of the rotor 16 so as to substantially align the adjacent pole face 18 with the pole position 1. Similarly, subsequent energization of the winding 14 associated with the pole position 2 will produce alignment between that pole position and the adjacent pole face 18. In this manner, the rotor 16 is rotated to inherently stable step positions which are determined by the magnetic structure of the stator 12 and the rotor 16. The actual energization of the windings 14 is sequenced and controlled by circuitry well-known in the art and designated as winding sequence and control 20.

In accordance with this invention; the stepper motor is not limited to the magnetically inherent step positions of the motor. Rather, different or additional step or stop positions are achieved.

Before proceeding with a description as to how the modified step positions are achieved, the following definitions will be helpful. As used herein, the word "position" or "positions" describes one or more distinct points which are fixed or stationary with respect to the stationary magnetic structure. The word "location" or "locations" describes one or more distinct points which are fixed or stationary with respect to the moving magnetic structure and move therewith. The description will now proceed relying on the definitions.

The rotor 16 is provided with a circular array of darkened areas or hash marks 22. Predetermined locations between the darkened areas 22 relative to a sensing position 24 represented by the intersection of dotted lines 26 and 28 are determined by optical sensing system 30. The optical sensing system 30 includes a light source in the form of a light emitting diode 32 which is in optical communication with the location 24 along the path 26 and a light detecting means in the form of a phototransistor 34 which is in optical communication with the position 24 along the path 28.

As the darkened area 22 and the locations therebetween pass the position 24, a sinusoidal light pattern is generated which in turn generates sinusoidal current flow through the transistor 34 and a resistor 36 connected to the emitter thereof. The sinusoidal current flow is depicted to waveform a in FIG. 2 which illustrates that current flow increases when the space between the darkened area 22 is at position 24 and current flow decreases when the darkened area 22 is at the position 24.

Figure 2:
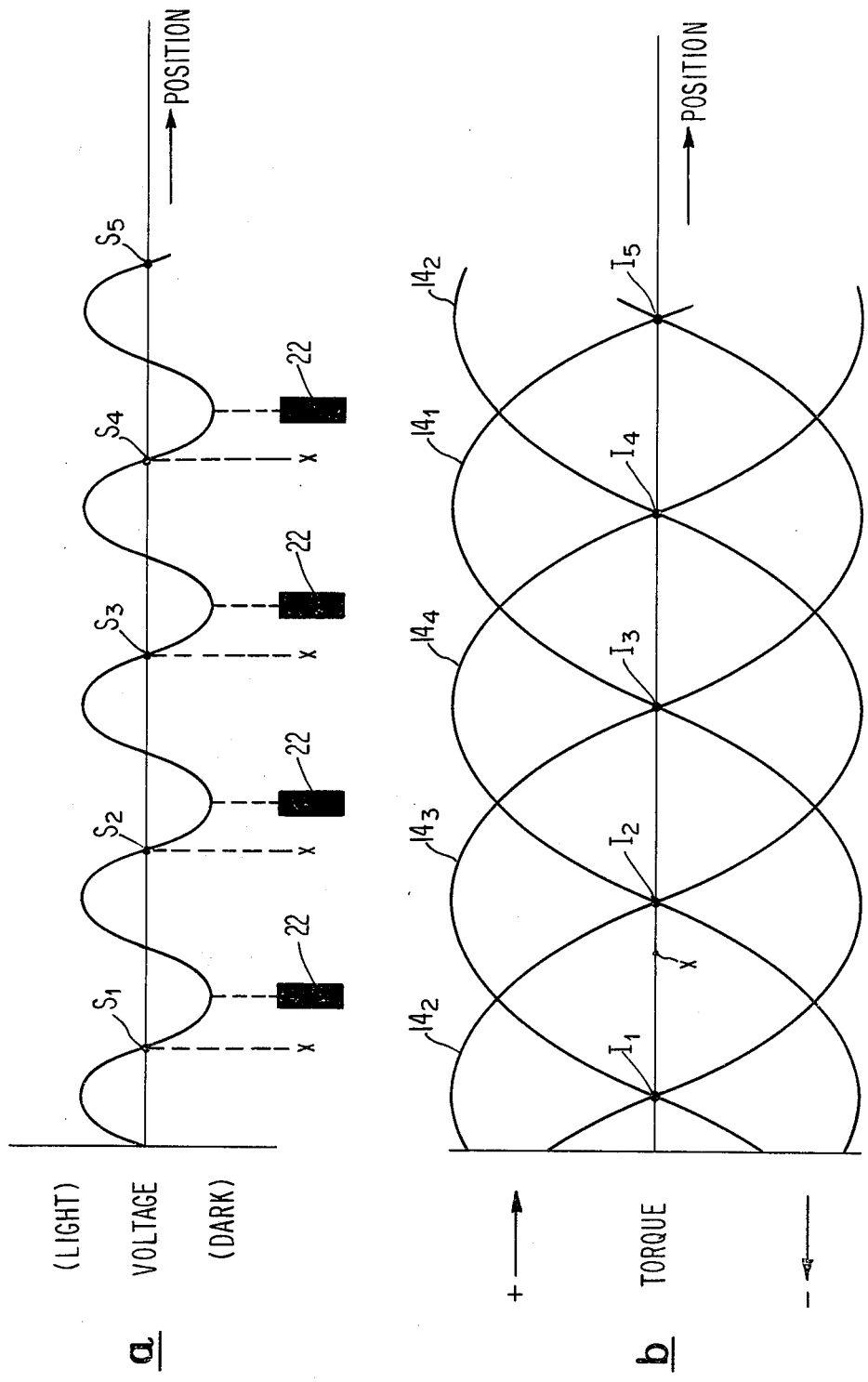
FIG. 2 is a diagram of waveforms which are utilized to explain the operation of the embodiments shown in FIG. 1.

The resultant sinusoidal voltage waveform which is produced across the resistor 36 is applied to a differential amplifier 38 along with a reference voltage supplied by the tap of a potentiometer 40 connected between a reference voltage $V_{ref}$ and ground. Where the tap on the potentiometer 40 is appropriately set so as to correspond with the DC level represented by the abcissa of the waveform a in FIG. 2, the output from differential amplifier 38 represents the distance between the locations x of the rotor 16 and the predetermined position 24. By providing a plurality of darkened areas 22 and locations x therebetween as shown in FIGS. 1 and 2, the distance between the plurality of locations and the predetermined position 24 is represented at the output of the differential amplifier 38. As shown in waveform a of FIG. 2, the modified step positions are represented by axis crossings $S_1$, $S_2$, $S_3$, $S_4$ and $S_5$ where the locations x are aligned with the position 24.

In accordance with another important aspect of the invention, the output signal from the differential amplifier 38 is applied to the circuitry for generating a signal having a distance component as well as velocity component. In this connection, the output signal from the differential amplifier 38 is applied to circuit means 24 which multiplies the signal by an appropriate constant A and applied to circuit means 44 which differentiates and multiplies the output signal by an appropriate constant B so as to produce a velocity component. The two components are then summed at a differential amplifier 46 and multiplied by an appropriate constant C by circuit means 48 so as to produce a position signal representing the distance of a predetermined location on the rotor 16 from the stop position 24 and the velocity at which that location is approaching the predetermined stop position.

In accordance with this invention, this distance and velocity signal is now utilized to control the motor so as to assure that the rotor 16 will stop at one of the modified, desired stop positions $S_1$, $S_2$, $S_3$, $S_4$ and $S_5$. In this connection, the output signal from the circuit 48 is applied to a circuit 50 which determines the absolute value of the position and velocity signal. The output from circuit 50 is then applied through a switch 52 when the switch is in the position shown in phantom, to a comparator 54 where it is compared with the actual current flowing through the energized windings 14 of the motor 10. The particular winding which is energized is determined by the winding sequence and control circuit 20 in response to the polarity of the position and velocity signal as determined by a polarity determining circuit 56 and a stop control circuit 58 schematically depicted as a switch 59 associated with a reference voltage +V which coacts with the switch 52. When a stop is initiated, the switch 59 is placed in the state shown in phantom.

When the motor 10 is running, the switch 59 is in the position shown in full. Similarly, the switch 52 is in the position shown in full so that a current reference source 61 is connected to the comparator 54 to limit the current through the windings 14 of the motor as determined by the source 61.

In order to control the current to the windings 14 of the motor in an analog manner during stopping so as to reduce the position and velocity signal to zero, the comparator 54 is responsive to the absolute value of the position and velocity signal as well as a signal representing the current through the energized windings 14 of the motor as determined by a motor current resistor 60. As long as the signal representing the motor current is less than the absolute value of the position and velocity signal, the output from the comparator 54 remains high. That high signal is applied to the data input of a D-type flip-flop 62 so as to produce a high going output applied to winding sequence and control circuitry 20 in response to clock pulses from a clock 64 which are applied to the clock input of a D-type flip-flop 62. When the absolute value of the position and velocity signal falls below the motor current signal, the output of the flip-flop 62 will go low so as to interrupt the current flow through the windings. When the current flow through the windings falls below the position and velocity signal, the output from the comparator 54 will again go high causing the output from the flip-flop 62 to go high so as to again supply current to the windings as will now be described in more detail with reference to FIG. 3.

Figure 3:
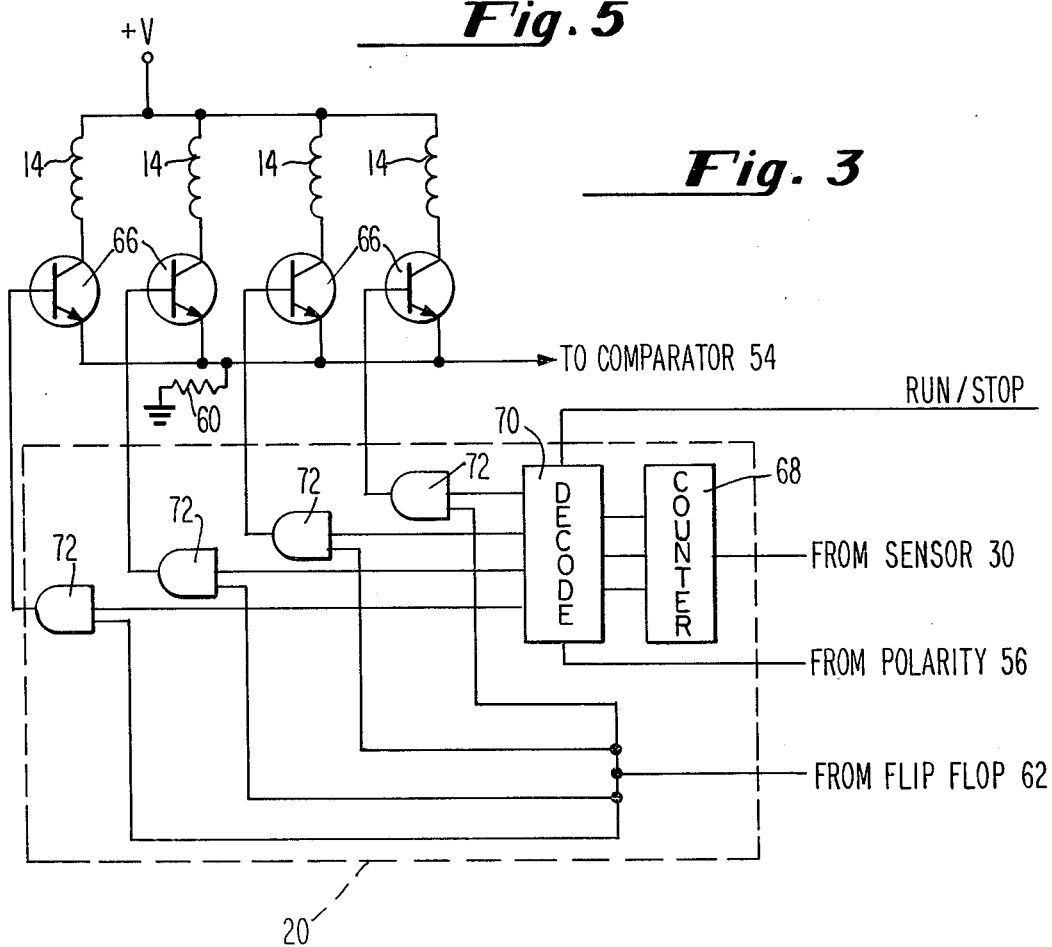
FIG. 3 is a schematic diagram of a portion of the motor control circuitry shown in FIG. 1.

As shown in FIG. 3, the windings 14 are connected between the voltage supply +V and ground through a plurality of power transistors 66 and the motor current sensing resistor 60 which is connected to the comparator 54.

The winding sequence and control 20 as shown in FIG. 3 comprises a counter 68, a decoder 70 and a plurality of AND gates 72 associated respectively with the transistors 66. As the output from the flip-flop 62 changes state reflecting that the motor sensor current exceeds the current reference provided by the position and velocity signal, the AND gates 72 are inhibited so as to turn any conducting transistor 66 off. The particular transistor 66 which is conducting is under the control of the counter 68 of the decoder 70 as will now be described.

During normal running operation, the input to the counter 68 from the sensor 30 advances the counter 68 and the decoder 70 decodes the count so as to pass a high going signal to the appropriate gate 72 which is enabled by the high output from the flip-flop 62. At the time of stopping, an output from the polarity circuitry 56 will go high or low so as to appropriately modify the decoded output from the decoder 70 which result in intermittent enabling of the appropriate AND gate 72 depending on the state of the flip-flop 62.

Referring now to waveform b in FIG. 2, torque curves for the rotary motor are illustrated for energization of the various windings $14_{1-4}$ as a function of rotor position. Magnetically inherent step positions are depicted by axis crossing $I_{1-5}$ for the various windings. For example, energization of the winding 14 represented by waveform $14_3$ will result in an inherently stable step position at axis crossing $I_3$ since a position to the left of $I_3$ will produce a positive torque causing the motor to advance to $I_3$ and a position to the right of $I_3$ will produce negative torque causing the motor to return to $I_3$. In accordance with this invention, the magnetically inherent stepping positions $I_{1-5}$ differ from the stop positions $S_1$-$S_5$ by a slight displacement along the position axis. The manner in which the rotor is stopped at a selected modified step position, e.g., stop position $S_2$, will now be described.

Assume that the switch 52 is closed at point x on the position axis. At that moment in time, the winding 14 represented by the torque curve $14_3$ is energized. In order for a predetermined location on the rotor 16 to step at position $S_2$, it it necessary to apply a braking torque to the rotor 16. This braking torque may be provided by energizing the winding 14 represented by the torque curve $14_1$ and this is accomplished automatically at the decoder 70 in response to the positive polarity output from the polarity sensing circuit 56 and the stop control circuit 58. As the distance to stop position $S_2$ is reduced, the motor current will exceed the current reference applied to the comparator 54 and the AND gate 72 associated with that particular winding 14 will be inhibited so as to interrupt current flow. When the current flow again falls below the current reference supplied to the comparator 54, the AND gate 72 will again be enabled. If the polarity of the error changes and the location on the rotor 16 overshoots stop position $S_2$, the polarity output from the polarity circuit 56 will again change the decoded output from the decoder 70 so as to apply a positive torque resulting from energization of the winding 14 represented by the torque curve $14_3$ with the flip-flop 62 changing state so as to interrupt the current flow until such time as the current reference representing the position and velocity signal reaches the axis crossing corresponding to rotor position $S_2$.

Figure 4:
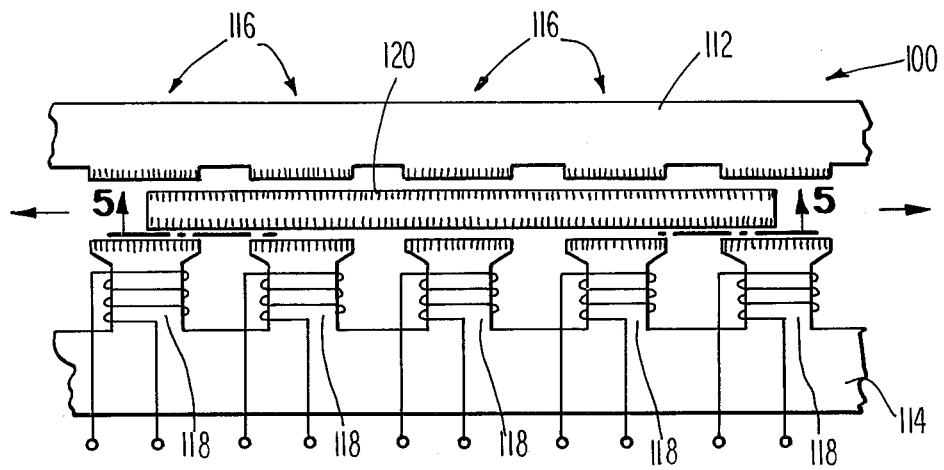
FIG. 4 is a top plan view of a linear motor utilized in another embodiment of the invention.
Figure 5:
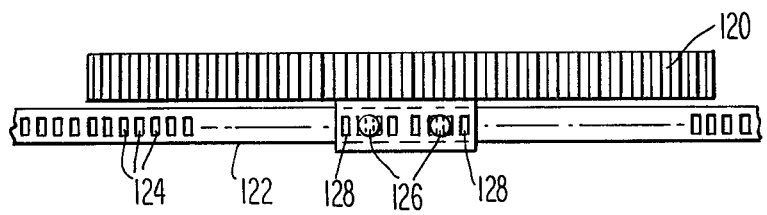
FIG. 5 is a view of the motor of FIG. 4 taken along line 5—5.

Reference will now be made to a linear motor embodiment of the invention. FIGS. 4 and 5 disclose a linear motor which forms the subject matter of copending application Ser. No. 809,646 filed June 24, 1977.

The motor comprises a stator 100 including an active portion 112 and an inactive portion 114. Pole positions 116 extend along the length of the stator 112 with the pole positions of the active portion 114 being energized by windings. 118. A slider 120 which is located in the air gap between the active portion 114 and the inactive portion 112 moves longitudinally along the motor in the direction depicted by the arrows.

In order to provide a position and velocity feedback, a timing band 122 as shown in FIG. 5 extends along the length of the motor. The timing band comprises a plurality of openings 124 which are sensed by optical sensing means comprising phototransistors 126 which are exposed to a light source (not shown) on the opposite side of the band 122 through a mask comprising openings 128. In this embodiment of the invention, the distance between a single location on the slider 120 and a plurality of stop positions must be determined. Further details concerning the optical sensing of position in a printer are disclosed in copending application Ser. No. 833,271 filed Sept. 14, 1977 which is incorporated herein by reference.

The openings 128 associated with each of the transistors 126 are appropriately spaced so as to generate two separate signals as shown in waveform a of FIG. 7. By providing the two separate signals from each of the transistors 126, more stop positions may be provided for the slider 120. In some applications such as movable print point printers as disclosed in the aforementioned application Ser. No. 833,271 (Attorney's Docket RM-828/EX-L-4) where the slider 120 would carry the print head, closely spaced stop positions as provided by the two signals may be required.

It will be understood that waveforms may be modified as shown in dotted lines if a different sensing arrangement such as that shown in copending application Ser. No. 833,351 filed Sept. 14, 1977, which is incorporated herein by reference, and wherein the petals of a daisy-type printing element are sensed directly.

Figure 8:
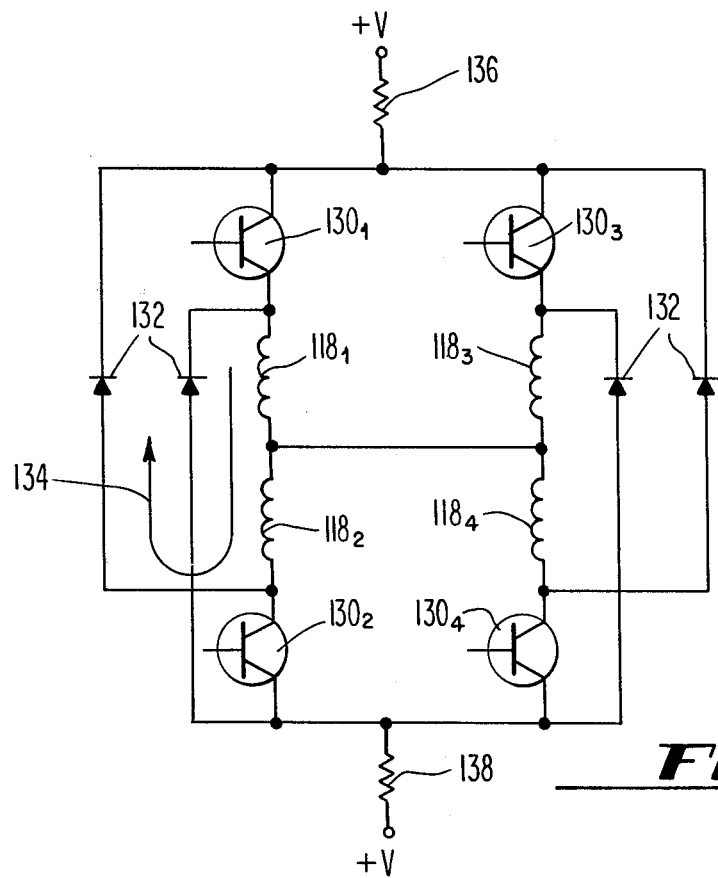
FIG. 8 is a schematic diagram of a portion of the motor control circuitry shown in FIG. 6.

In this embodiment of the invention, the windings 118 are energized in pairs by circuitry shown in FIG. 8. The windings $118_1$–$118_4$ are connected to power supplies $+V$ and $-V$ through switching transistors $130_{1-4}$. By saturating the transistors in pairs, i.e., $130_1$ and $130_2$, $130_2$ and $130_3$, $130_3$ and $130_4$ and $130_4$ and $130_1$, the windings $118_{1-4}$ are energized in pairs. Diodes 132 provide current circulating paths when switching from one pair to another. For example, a current circulating path 134 through a diode 132 is utilized when changing energization from the winding pair $118_1$ and $118_2$ to the winding pair $118_2$ and $118_3$ while the transistor $130_2$ is turned off. Resistors 136 and 138 are utilized to sense the current flow through the windings $118_{1-4}$.

Figure 6:
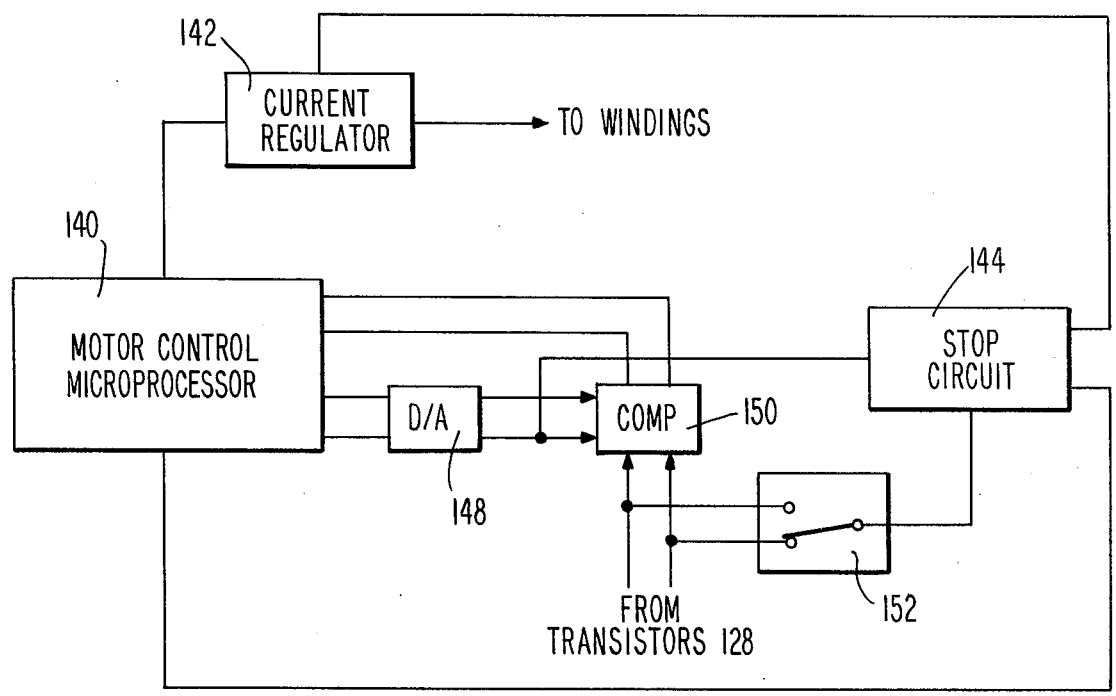
FIG. 6 is a block diagram of an embodiment of the invention utilizing the linear motor of FIGS. 4 and 5.

In order to achieve the stop position $S_{1-12}$ as shown in waveform a of FIG. 7, the circuit shown in FIG. 6 is utilized. As shown therein, a motor control microprocessor 140 such as an F-8 manufactured by Fairchild Camera and Instrument Corporation provides control of the energization sequence and a regulator current 142 controls the current to the motor windings. In addition, the microprocessor 140 operates in conjunction with a stop circuit 144 including the components described in FIG. 1 to control the current to the windings $118_{1-4}$ so as to achieve the modified step positions which differ in part from the magnetically inherent stepping positions $I_{1-6}$. More particularly, the stop positions $S_1$, $S_3$, $S_5$, $S_7$, $S_9$, and $S_{11}$ correspond with step positions $I_1$, $I_2$, $I_3$, $I_4$, $I_5$ and $I_6$ whereas the stop positions $S_2$, $S_4$, $S_6$, $S_8$, $S_{10}$ and $S_{12}$ are additional. An output 145 of the stop circuit 144 is connected to the current regulator 142 which switches the transistors $130_{1-4}$ so as to properly control the current in accordance with the position and velocity signal generated by the stop circuit 144. Another output 146 from the stop circuit 144 provides a polarity input to the microprocessor 140.

In order to properly locate the stop positions $S_{1-12}$ shown in waveform a of FIG. 7, it is necessary to calibrate the output from the phototransistors 128 shown in FIG. 5. For this purpose, a D/A converter 148 in combination with a comparator 150 is provided and the calibrated output from the D/A converter 148 is applied to the stop circuit 144. A switch 152 selectively connects the phototransistors 128 to the stop circuit 144.

Referring now to the torque curves of waveform b in FIG. 7, the manner in which the slider 120 is stopped will be described. Assume that a decision to stop is made at location x when the windings $118_3$ and $118_4$ are energized. At that moment, a negative braking torque is required and the windings $118_1$ and $118_2$ are energized. The current through the windings $118_1$ and $118_2$ is controlled in response to the magnitude of the waveform $128_1$ approaching stop position $S_2$. The braking current applied to the windings $118_1$ and $118_2$ is reduced as the distance and velocity of the location on the slider relative to the stop position $S_2$ is reduced. The same technique is utilized to stop at all of stop positions $S_1$–$S_{12}$ even though some of the stop positions S correspond with inherent step positions $I_1$–$I_6$. In this connection, it will be noted that the difficulty in holding tolerances on the magnetic structure may produce step positions $I_1$–$I_6$ which are slightly displaced from the desired stop positions. However, for some applications, the step positions $I_1$–$I_6$ may be satisfactory so as to permit the use of a mixture of magnetically inherent and modified step positions. Where such a mixture is desirable, the microprocessor 140 is programmed to control the current regulator 142 at the inherent step positions so as to override the stop circuit 144.

In the embodiment described with respect to waveform b of FIG. 7, some of the stop positions correspond to the inherent step positions $I$–$I_6$. However, this need not be the case as shown in waveform c of FIG. 7 wherein the stop positions are equally spaced on either side of the inherent step positions, i.e., the stop positions correspond exactly to positions $S_1$–$S_{12}$ (only positions $S_7$, $S_8$, $S_9$ and $S_{10}$ are shown) which are equally spaced on either side of the inherent step positions.

It will be understood that the linear stepper motor of the embodiment shown in FIGS. 4–8 might be replaced by a rotary stepper motor. Moreover, where the rotary motor controls the printing element, a rotary stepper may also be used in a printer. In this connection, reference is made to the printer of copending applications Ser. No. 809,923 filed June 24, 1977 which is incorporated by reference herein along with copending application Ser. No. 833,351 filed Sept. 14, 1977 which describes sensing the location of a rotor having print elements integral therein.

It will also be understood that the phrase magnetic stepper motor as used herein refers to variable reluctance as well as permanent magnet stepper motors which are characterized by inherently stable step positions which occur in response to sequential energization of individual windings or winding combinations.

Although a particular embodiment of the invention has been shown and described and various modifications suggested, other modifications and embodiments will occur to those of ordinary skill in the art which will fall within the true spirit and scope of the invention as set forth in the appended claims.

What is claimed is:

1. A motor drive for a stepper motor comprising a movable magnetic structure, a stationary magnetic structure and a plurality of windings associated with one said structure at a plurality of pole positions, said movable magnetic structure being inherently capable of moving in discrete magnetically determined steps relative to said stationary structure in response to selective energization of said windings, said drive comprising:
   sensor means for sensing a location of said movable magnetic structure relative to a predetermined stop position differing from any of said magnetically determined steps;

position indicating means coupled to said sensor means for generating a position signal representing the distance of said location of said movable magnetic structure from said stop position;

reference means coupled to said position indicating means for generating a motor reference signal in response to said distance;

comparison means coupled to said reference means for comparing said motor reference signal to a signal representing the state of the motor; and motor control means coupled to said comparison means for energizing selected windings of said motor in response to the comparison so as to reduce said distance and move said location to said stop position.

2. The motor drive of claim 1 wherein said signal representing the state of said motor represents the current flow through the energized windings and said reference signal represents the required current flow to reduce said distance, said motor control means adjusting said current flow so as to reduce said distance.

3. The motor drive of claim 2 wherein said motor control means periodically interrupts said current flow through the energized windings so as to vary the average current therethrough to reduce said distance.

4. The motor drive of claim 1 wherein said position indicating means generates an error signal representing the distance from said one position and the velocity of said movable magnetic structure in approaching said one position.

5. The motor drive of claim 1 wherein said sensor means optically senses the location relative to said stop position.

6. The motor drive of claim 1 wherein said sensor means comprises a plurality of sensing elements for sensing a plurality of locations relative to a plurality of positions.

7. The motor drive of claim 1 wherein said movable magnetic structure comprises a plurality of locations thereon and said sensor means senses the distance between said locations and said predetermined stop position, said motor control means reducing the distance between each of said locations and said stop position so as to provide a plurality of step positions differing from said magnetically determined step position.

8. The motor drive of claim 1 wherein said sensor means senses the location of said movable magnetic structure relative to a plurality of stop positions, said motor control means reducing the distance between said location and each of said stop positions so as to move said location to said stop position and provide a plurality of stop positions differing from said magnetically determined step positions.

9. The motor drive of claim 1 wherein said sensor means comprises a plurality of sensing elements, each of said sensing elements sensing different locations of the moving magnetic structure relative to different predetermined stop positions.

10. A method of modifying the step positions of a stepper motor comprising a movable magnetic structure, a stationary magnetic structure and a plurality of windings associated with one said structure at a plurality of pole positions, said movable magnetic structure being inherently capable of moving in magnetically determined steps relative to said stationary structure in response to selective energization of said windings, said method comprising the following steps:

sensing the location of the movable magnetic structure;

determining the distance between a location on the movable magnetic structure and a predetermined stop position differing from any of said magnetically determined steps;

selectively energizing the windings of said motor so as to reduce said distance in response to the determined distance; and stopping said location of said movable magnetic structure substantially at said predetermined position.

11. The method of claim 10 wherein the distance between the sensed location and any of a plurality of predetermined stop positions is determined.

12. The method of claim 10 wherein the distance between the stop position and any of a plurality of locations is determined.

13. The method of claim 10 further comprising the following steps:

determining the velocity at which the location approaches the movable magnetic structure; and selectively energizing the windings of said motor so as to reduce said distance and said velocity.

* * * * *